(12) United States Patent
Derakhshani

(10) Patent No.: US 10,554,918 B1
(45) Date of Patent: Feb. 4, 2020

(54) HIGH DEFINITION, LARGE CAPTURE VOLUME, CAMERA ARRAY SYSTEM

(71) Applicant: Alibaba Group Holding Limited, George Town (KY)

(72) Inventor: Reza R. Derakhshani, Shawnee, KS (US)

(73) Assignee: Alibaba Group Holding Limited, George Town, Grand Cayman (KY)

(*) Notice: Subject to any disclaimer, the term of this patent is extended or adjusted under 35 U.S.C. 154(b) by 0 days.

(21) Appl. No.: 16/212,516

(22) Filed: Dec. 6, 2018

(51) Int. Cl.
| | |
|---|---|
| *H04N 5/3745* | (2011.01) |
| *H04N 5/225* | (2006.01) |
| *G02B 7/04* | (2006.01) |
| *H04N 5/232* | (2006.01) |
| *G06T 5/50* | (2006.01) |
| *H04N 13/243* | (2018.01) |

(52) U.S. Cl.
CPC ............. *H04N 5/3745* (2013.01); *G02B 7/04* (2013.01); *G06T 5/50* (2013.01); *H04N 5/2256* (2013.01); *H04N 5/23296* (2013.01); *H04N 13/243* (2018.05)

(58) Field of Classification Search
CPC .......... G02B 7/04; G06T 5/50; H04N 5/3745; H04N 13/243; H04N 5/2256; H04N 5/23296
See application file for complete search history.

(56) References Cited

U.S. PATENT DOCUMENTS

2018/0139376 A1* 5/2018 Passarella ................ G02B 7/28

OTHER PUBLICATIONS

Wilburn et al., "High Performance Imaging Using Large Camera Arrays," ACM Transactions on Graphics, Jul. 2005, 24(3):765-776.
Wilburn, Standford.edu [online], "High Performance Imaging Using Arrays of Inexpensive Cameras," Dec. 2004, retrieved on Sep. 16, 2019, retrieved from URL<https://graphics.stanford.edu/~wilburn/wilburn_thesis.pdf>, 128 pages.

* cited by examiner

*Primary Examiner* — Huy T Nguyen
(74) *Attorney, Agent, or Firm* — Fish & Richardson P.C.

(57) ABSTRACT

The technology described herein can be embodied in a method that includes capturing, using a first array of multiple image acquisition devices, a first set of images of a scene, and capturing, using a second array of multiple image acquisition devices, a second set of images of the scene. The devices of the first array are each focused at a first distance, and the devices of the second array are each focused at a second distance. The method also includes identifying a first image and a second image in the first and second sets of images, respectively, to include a feature of interest. The method further includes determining a focal score for each of the first and second images, selecting one of the images based on a comparison of the corresponding focal scores, and initiating an authentication process based on the selected image.

20 Claims, 8 Drawing Sheets

HIGH DEFINITION, LARGE CAPTURE VOLUME, CAMERA ARRAY SYSTEM

TECHNICAL FIELD

This specification generally relates to image capture devices.

BACKGROUND

Systems incorporating a biometric identification technology, such as face recognition or iris recognition, often include a camera that captures an image of a user. The captured image is then processed to authenticate the user using the biometric identification technology.

SUMMARY

In one aspect, this document features a computer-implemented method that includes capturing, using a first array of multiple image acquisition devices, a first set of images of a scene, and capturing, using a second array of multiple image acquisition devices, a second set of images of the scene. The multiple image acquisition devices of the first array are each focused at a first distance, and the multiple image acquisition devices of the second array are each focused at a second distance that is different from the first distance. The method also includes identifying a first image in the first set of images to include a feature of interest, and identifying a second image in the second set of images to include the feature of interest. The method further includes determining a focal score for each of the first image and the second image, selecting one of the first image or the second image based on a comparison of the corresponding focal scores, and initiating an authentication process based on the selected image.

In another aspect, this document features an imaging system that includes a first array of multiple image acquisition devices that captures a first set of images of a scene, and a second array of multiple image acquisition devices that captures a second set of images of the scene. The multiple image acquisition devices of the first array are each focused at a first distance, and the multiple image acquisition devices of the second array are each focused at a second distance that is different from the first distance. The system also includes one or more processing devices that are programmed to identify a first image in the first set of images to include a feature of interest, identify a second image in the second set of images to include the feature of interest, and determine a focal score for each of the first image and the second image. The one or more processing devices are configured or programmed to select one of the first image or the second image based on a comparison of the corresponding focal scores, and initiate an authentication process based on the selected image.

In another aspect, this document features one or more machine-readable storage devices having encoded thereon computer readable instructions for causing one or more processing devices to perform various operations. The operations include generating a first control signal for operating a first array of multiple image acquisition devices to capture a first set of images of a scene, and generating a second control signal for operating a second array of multiple image acquisition devices to capture a second set of images of the scene. The multiple image acquisition devices of the first array are each focused at a first distance, and the multiple image acquisition devices of the second array are each focused at a second distance that is different from the first distance. The operations also include identifying a first image in the first set of images to include a feature of interest, identifying a second image in the second set of images to include the feature of interest, and determining a focal score for each of the first image and the second image. The operations further include selecting one of the first image or the second image based on a comparison of the corresponding focal scores, and initiating an authentication process based on the selected image.

Implementations of the above aspects can include one or more of the following features.

The fields of view of adjacent image acquisition devices in each of the first array and the second array can have a partial overlap. The dimension of the partial overlap can be configured based on a size of the feature of interest. One or more illumination sources can be used for illuminating with electromagnetic radiation of a first wavelength range during a first time period, and with electromagnetic radiation of a second wavelength range during a second time period. A third control signal can be generated for activating one or more illumination sources during the first time period, and a fourth control signal can be generated for activating the one or more illumination sources during the second time period. Under illumination by the first wavelength range, a third image can be captured using a first set of sensors of a pixel array of an image acquisition device corresponding to the selected image. Under the illumination by the second wavelength range, a fourth image can be captured using a second set of sensors of the pixel array. A focal score can be determined for each of the third image and the fourth image, and the authentication process can be initiated based on at least one of the third image or the fourth image that has the higher focal score. In some cases, a first difference image using pixel-wise differences between (i) the third image and (ii) the selected one of the first image or the second image can be calculated. A second difference image using pixel-wise differences between (i) the fourth image and (ii) the selected one of the first image or the second image can also be calculated, and a composite image can be generated using the first and second difference images. The authentication process can then be generated based on the composite image.

A first zoom factor associated with the image acquisition devices in the first array can be different from a second zoom factor associated with the image acquisition devices in the second array. The first zoom factor and the second zoom factors can be selected such that a size of the feature of interest in corresponding images are equal or substantially equal. The scene can be illuminated with electromagnetic radiation of the first wavelength range and the second wavelength range in a coded pattern. Initiating the authentication process based on the selected image can include illuminating the scene with electromagnetic radiation of a first wavelength range by activating a corresponding illumination source in an on-off pattern over multiple time periods, and capturing multiple images using a set of sensors of a pixel array of an image acquisition device corresponding to the selected image. Each of the multiple images are captured during a time period when the illumination source is switched on. A matched filtering operation can be performed using the multiple images to generate a third image that aggregates information content from the multiple images, and the authentication process can be initiated using the third image.

Particular implementations of the subject matter described in this disclosure can be implemented so as to realize one or more of the following advantages. By using fixed-focus cameras disposed in multiple arrays, a large three-dimensional field-of-view can be covered. Configuring the focal distance and/or zoom factors to be different for different arrays, and configuring the fields of view of individual cameras within an individual array to be partially non-overlapping, a significantly high likelihood of at least one camera capturing a high-quality image of a particular feature of interest (e.g. an eye of a subject located within the three-dimensional field-of-view) can be realized. The focus for the camera capturing the feature of interest can be fine-tuned by taking advantage of chromatic aberration effects of the corresponding lenses, for example, by changing the illumination wavelengths, and capturing multiple images with different corresponding focal distances. Overall, one image can be selected for further processing from the multiple captured images based on comparing corresponding focal scores. This in turn can potentially improve the underlying biometric authentication systems and/or the usability of such systems in various applications. For example, the technologies described herein may allow for implementing accurate eye-print identification/verification systems using arrays of simple and inexpensive cameras. This can help in making the hardware less complex and expensive, thereby making the technology usable in a wider range of applications.

The details of one or more implementations of the present disclosure are set forth in the accompanying drawings and the description below. Other features and advantages of the present disclosure will be apparent from the Detailed Description, the Claims, and the accompanying drawings.

DETAILED DESCRIPTION

Figure 1:
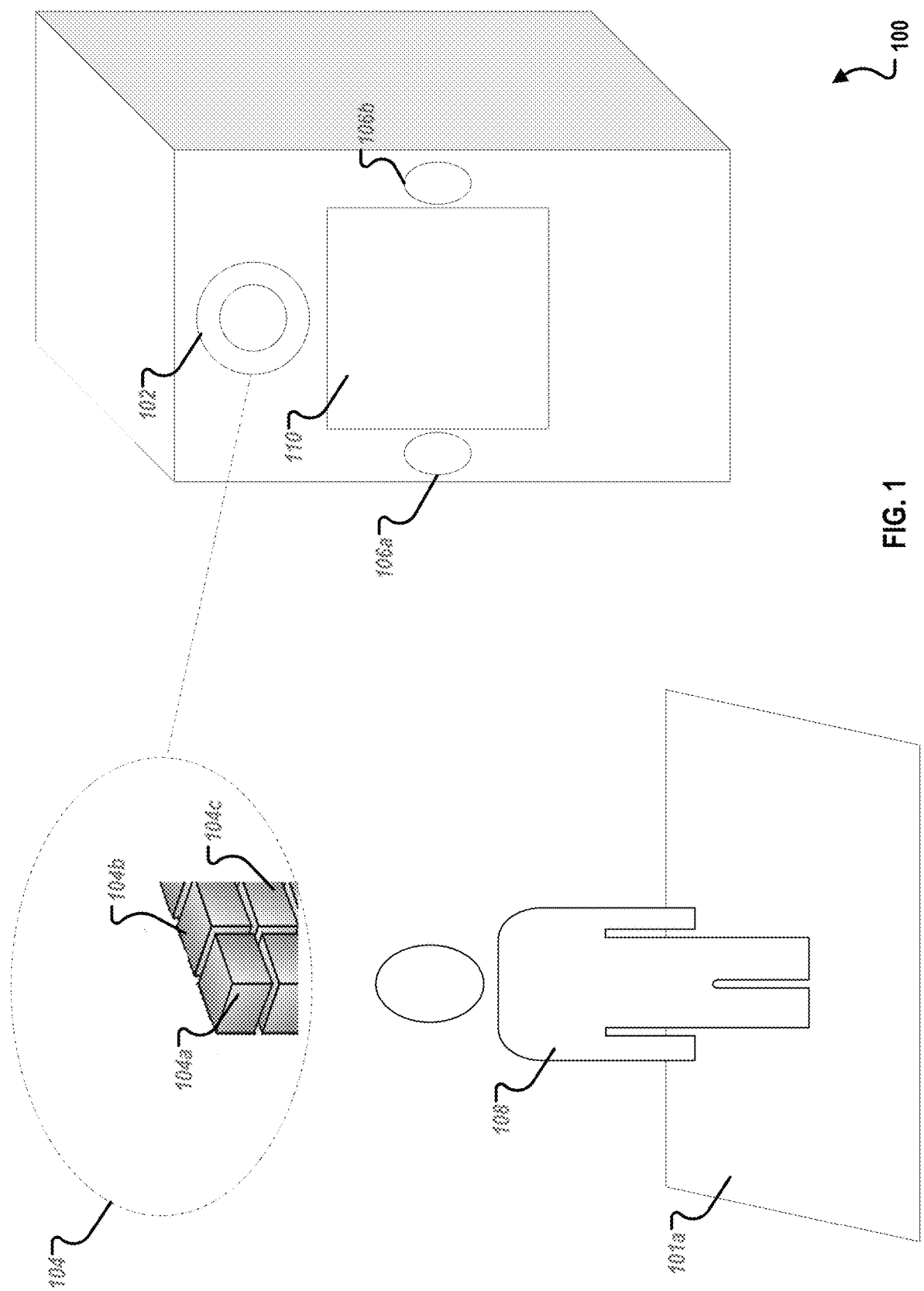
FIG. 1 shows an example environment in which a biometric authentication system may be deployed.

The technology described herein is generally directed to a camera array that can be used for capturing images for a biometric authentication system (e.g., an eye-print or face verification system). More specifically, the camera array includes an arrangement of individual cameras, each of which have a fixed field of view, focus, and zoom, but together cover a large capture volume that represents a likely location of a subject. If a separate image is captured with each of the multiple simple and inexpensive cameras in the array, at least one of the multiple cameras is likely to capture an appropriately focused image of the feature of interest (e.g., the eyes of the subject). The representative image can be selected from the multiple captured images for further processing, and can be used to authenticate the subject. In addition, chromatic aberration effects in individual camera lenses cause lights of different wavelengths to have small variations in focal lengths. Such small variations can be used to fine tune the focal length of an image captured using a fixed focus lens. This can be done by illuminating the subject using different wavelengths or wavelength ranges, and capturing multiple images using corresponding sensors. The best focused image can then be selected for further processing.

Various biometric identification/authentication systems are based on capturing images of a user, from which one or more representative image can be selected and compared with template images captured during an enrollment process. For example, a biometric authentication system that uses eye print identification may require users to pose for one or more images of their eyes during an enrollment process. The images captured during the enrollment process may be stored on a storage device accessible to the biometric authentication system. During run-time, an eye print image can be captured and compared with one or more template images to determine if the user may be authenticated. In such image-based biometric authentication systems, capturing a high-quality image (e.g., a well-focused image) of a feature of interest (e.g., an eye of a user) can be important. However, because the exact location/distance of the user from the camera may not be known, a range of distances from the camera (also referred to as a three-dimensional field-of-view, or capture volume) may need to be imaged to capture an image suitable for further processing. In some cases, an adjustable-focus camera can be used to capture a well-focused image of a user, or more particularly a feature of interest associated with the user. However, such cameras may be expensive and/or complex, and hence their use may not be feasible for some applications.

To capture well-focused images, high-quality cameras generally use lenses that require manual or automatic focusing. Unless the lens is focused correctly, the subject will appear soft and blurry. Adjustable focus cameras can be used to capture images with the correct focal distance. However, adjustable-focus lenses that are able to capture well-focused images over a large capture volume may be too expensive and/or complex for implementing on widely deployed kiosk devices. While simple fixed-focus cameras can be inexpensively deployed on such devices, using one or more such cameras without additional modifications may not guarantee capturing of well-focused images usable for authentication purposes. For example, if a single fixed-focus camera is deployed to capture the image of a subject, and the subject is not exactly at the focal distance of the camera, the resulting image is likely to be blurry and unusable for further processing. In addition, the field of view (FOV) of an individual camera may not be sufficient to capture a feature of interest for various potential locations of the subject.

The technology described herein allows for arranging multiple fixed-focus cameras in the form of one or more arrays, such that at least one of the individual cameras capture a well-focused image of a feature of interest in a subject. By having each of multiple arrays focused at a different focal distance, and arranging the fields of view of the individual cameras to be at least partially non-overlapping, a large capture volume can be covered. The amount of overlap between the fields of view (FOVs) of adjacent individual cameras can be determined based on the dimension of the feature of interest, for example, the size of an eye. This can increase the likelihood of at least one camera capturing the feature of interest. Further, by taking advantage of chromatic aberration effects, the focus of each fixed-focus camera can be fine-tuned not by adjusting the focal length of the lens, but by using illumination of different wavelength ranges. In optics, chromatic aberration refers to an effect resulting from differential bending of light of different wavelengths by a lens. The technology described herein leverages the chromatic aberration effect (which are often encountered in inexpensive lenses) to compare the degree of focus of images captured under different illumination wavelengths, and select the best-focused image from such images. For example, a focal score can be calculated for each of the images captured under different illuminations, and the image with the highest focus score can be selected as the representative image. In some implementations, the wavelength ranges used in illuminating the subject may be selected in accordance with the features(s) of interest. For example, near-infrared (NIR) wavelengths may be used for detecting eye vasculature which may not be as detectable under other wavelengths, and/or wavelengths in the 380-550 nanometers (nm) range may be used in detecting periocular micro-features in the eye print of the user.

FIG. 1 depicts a kiosk device 100 as an example environment to which a biometric authentication system may be deployed, according to some implementations of the present disclosure. Such a kiosk device may be used for various purposes that require authenticating users via one or more biometric authentication processes. For example, the kiosk 100 can include an ATM that allows a user to withdraw money from a bank account. In another example, the kiosk 100 may be deployed at a restaurant of a fast-food outlet, and allow a user to order and pay for food. The kiosk 100 may also be deployed at an entry point (e.g., at the gate of an arena or stadium) to authenticate entrants prior to entering the venue. In general, the kiosk 100 may be deployed at various types of locations to authenticate users interactively, or even without any active participation of the user.

In some implementations, the kiosk 100 can include one or more components that support a biometric authentication system. For example, the kiosk 100 can include a camera array assembly 102 that captures images of users interacting with the kiosk 100. The camera array assembly 102 can include an arrangement of individual camera arrays 104. In some implementations, the camera array assembly 102 may include multiple arrays of low-complexity cameras, where the focal length of cameras in a particular array is fixed, but their fields-of-view (FOV) are at least partially non-overlapping to jointly cover a two-dimensional FOV, which is larger than the FOV of a single camera. In this example, as shown in FIG. 1, the camera array assembly 102 includes multiple arrays 104a, 104b, 104c (104 in general), and each array includes multiple cameras. For illustration purposes, assume each array 104a, 104b, and 104c has a different focal distance f1, f2, and f1, respectively, and a different zoom z1, z2, and z3, respectively. Each camera in the same array (e.g., 104a) can have the same focal distance (f1, in this example). Such an arrangement of cameras ensures multiple focal distances are covered by the camera array assembly 102, which, together with the large two-dimensional FOVs of each assembly, results in a large three-dimensional capture volume.

Figure 2A:
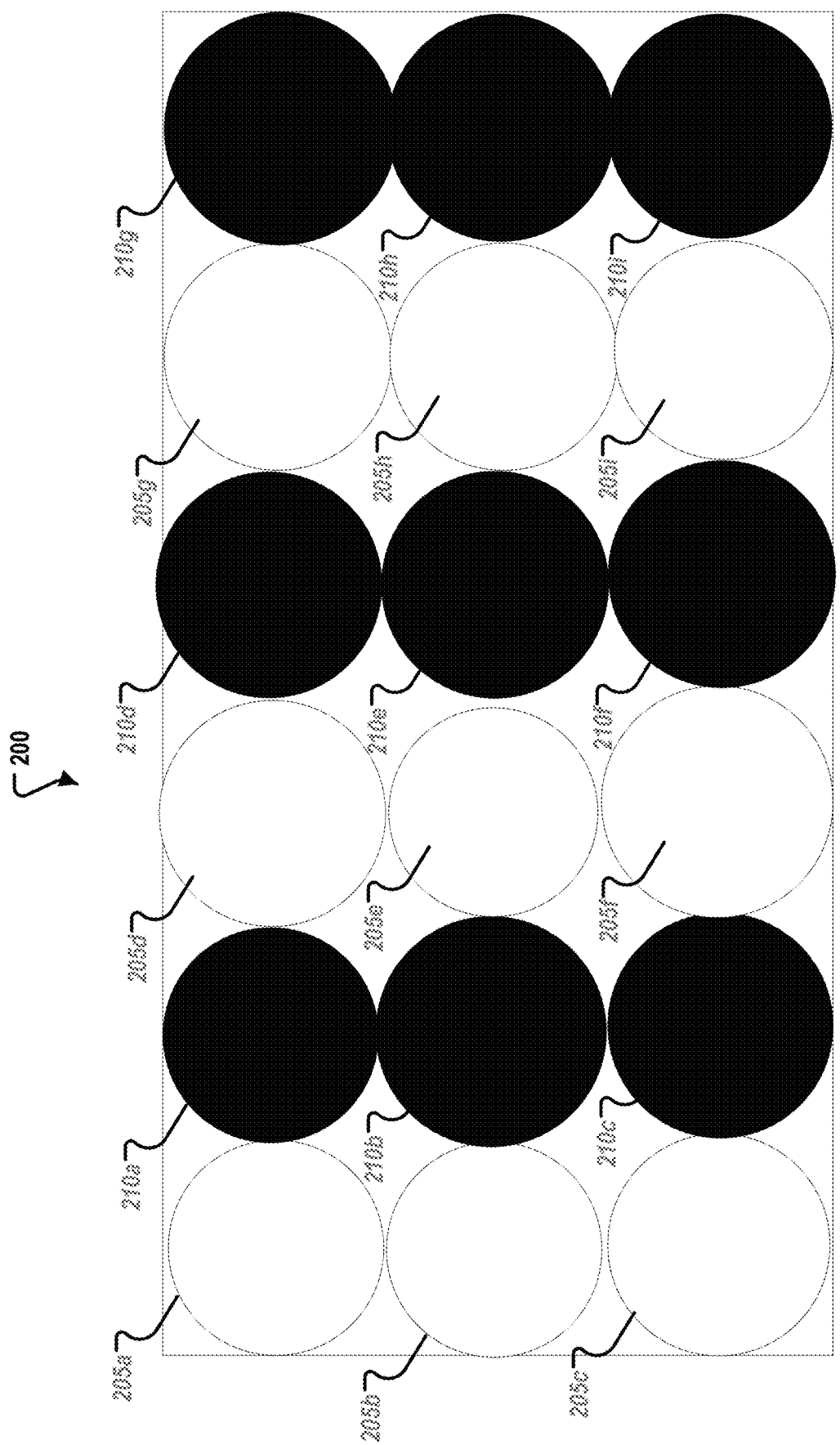
FIG. 2A is a schematic diagram of an example arrangement of multiple arrays of cameras, in accordance with some implementations of the present disclosure.
Figure 2B:
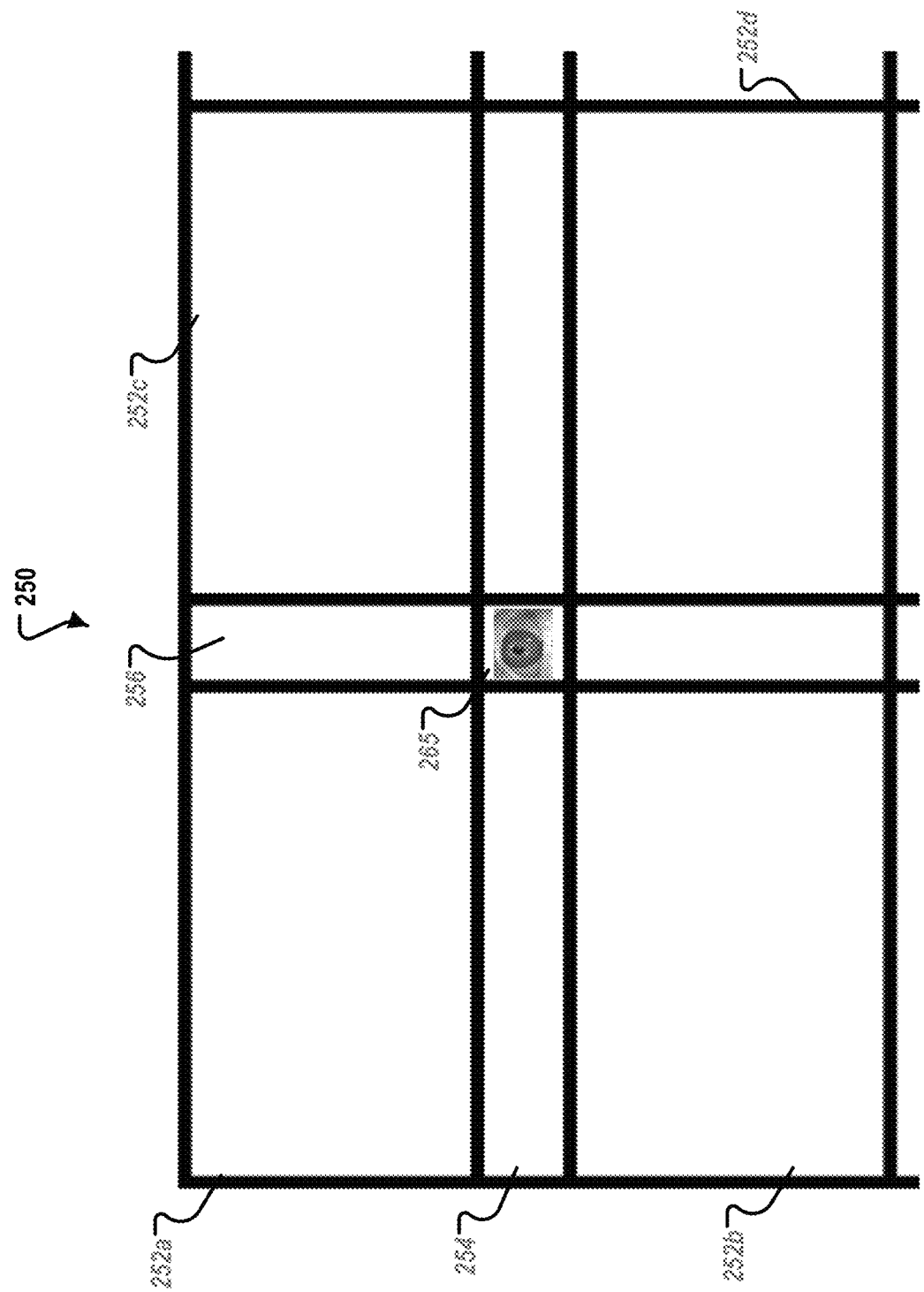
FIG. 2B depicts an example arrangement of field of view of an array of cameras.

FIG. 2A is a schematic diagram of an example arrangement of multiple arrays of cameras, in accordance with some implementations of the present disclosure. In the illustrative example of FIG. 2A, the camera assembly 200 includes two arrays of cameras, and each array includes nine cameras. Each array of nine cameras is distributed as a 3×3 array. Specifically, cameras of the first array are represented as 205a-205i (205, in general), and cameras of the second array are represented as 210a-210i (210, in general). Each camera in the first array has a same focal distance f1 and a zoom z1, while each camera in the second array has a same focal distance f2 and zoom z2. In some implementations, there can be more than two arrays of cameras and/or each array can have more (or less) than three cameras. FIG. 2B depicts an example arrangement 250 of FOVs in a particular array of cameras. Specifically, FIG. 2B shows the FOVs 252a-252d (252, in general) for four different individual cameras. Each FOV 252 corresponds to a separate camera, and the cameras a arranged in the arrays in a way such that the FOV of each camera partially overlaps with the FOV of an adjacent camera. For example, the FOV 252a overlaps with the FOV 252b in the region 254, and with the FOV 252c in the region 256. The other FOVs also overlap with one another in corresponding regions. In some implementations, the dimensions of the overlapping regions are determined in accordance with expected dimensions of a feature of interest. For example, for an eye-print based authentication system, the dimensions of the overlapping regions can be determined in accordance with an expected height and width of a human eye. This can be done, for example, by determining the overlaps such that the overlapping region 265 of four separate FOVs 252 is large enough to cover the eye of a user. Arranging the FOVs 252 of the cameras in such ways can increase the likelihood of the feature of interest (an eye, in this example) being completely captured by at least one camera in an array.

Referring again to FIG. 1, the kiosk 100 also includes an illumination source 106. For illustration purposes, the example of FIG. 1 includes two illumination sources 106a and 106b (106, in general), and each is located at one side of the kiosk device. The illumination source 106 can include one or more light emitting diodes (LEDs) that generate electromagnetic radiation at multiple wavelengths. In some implementations, the wavelength ranges can include the visible spectrum of about 400-700 nm, the NIR spectrum of about 700-1400 nm, and/or wavelengths in other ranges. While the example in FIG. 1 shows one particular configuration of the two illumination sources 106, other locations and numbers of illumination sources 106 are possible. For example, a single illumination source may be positioned between the screen 110 and the camera array 102. In some cases, the illumination sources can be external to the kiosk 100.

The focal length required to capture suitable images for authenticating the user 108 depends on a distance of the user 108 from the kiosk 100. For example, when a user is standing at a distance f1 from the kiosk, one or more cameras in the camera array 104a (that has a focal distance of f1) can capture focused images of the user. In such cases, the images captured by camera arrays 104b and 104c are likely to be out-of-focus, and may be discarded. In another instance, if the user is standing at a distance f2 from the kiosk 100 (e.g., due to having long hands that allow the user to interact with the kiosk 100 from a greater distance), one or more cameras in the camera array 104b (that has a focal distance of f2) can capture focused images of the user. In such cases, the images captured by camera arrays 104a and 104c are likely to be out-of-focus, and may be discarded. Further, each of the camera arrays 104 captures a corresponding set of images, and only a subset of images in each set includes the feature of interest. For example, if the user is standing at a distance f2, and the images captured by the camera array 104b are in focus, only a few images of the set captured using the different individual cameras in the array 104b may include the eye of the user. Only those images that are in focus, as well as include the feature of interest can be used in further processing, while the rest of the images are discarded. In some implementations, focus scores of the captured images are calculated and the image(s) of the feature of interest with corresponding acceptable focus score(s) can be selected for use by the underlying authentication system.

In some implementations, the technology described herein also facilitates fine-tuning of focal length to a value between the consecutive focal lengths afforded by the focal lengths of the individual arrays 104. For example, even where f2 is the best representative focal length among f1, f2, and f3, the true focal length of the feature of interest (e.g., the eye of the user) can be better represented by f2+$\Delta$f that lies between f2 and f3. In such cases, chromatic aberration effects of the corresponding camera can be leveraged to fine-tune the focal distance. This can be done, for example, by illuminating the subject (e.g., the user interacting with the kiosk 100) using multiple different wavelengths or wavelength ranges, and leveraging chromatic aberration characteristics that bend lights of different wavelengths differently.

Figure 3:
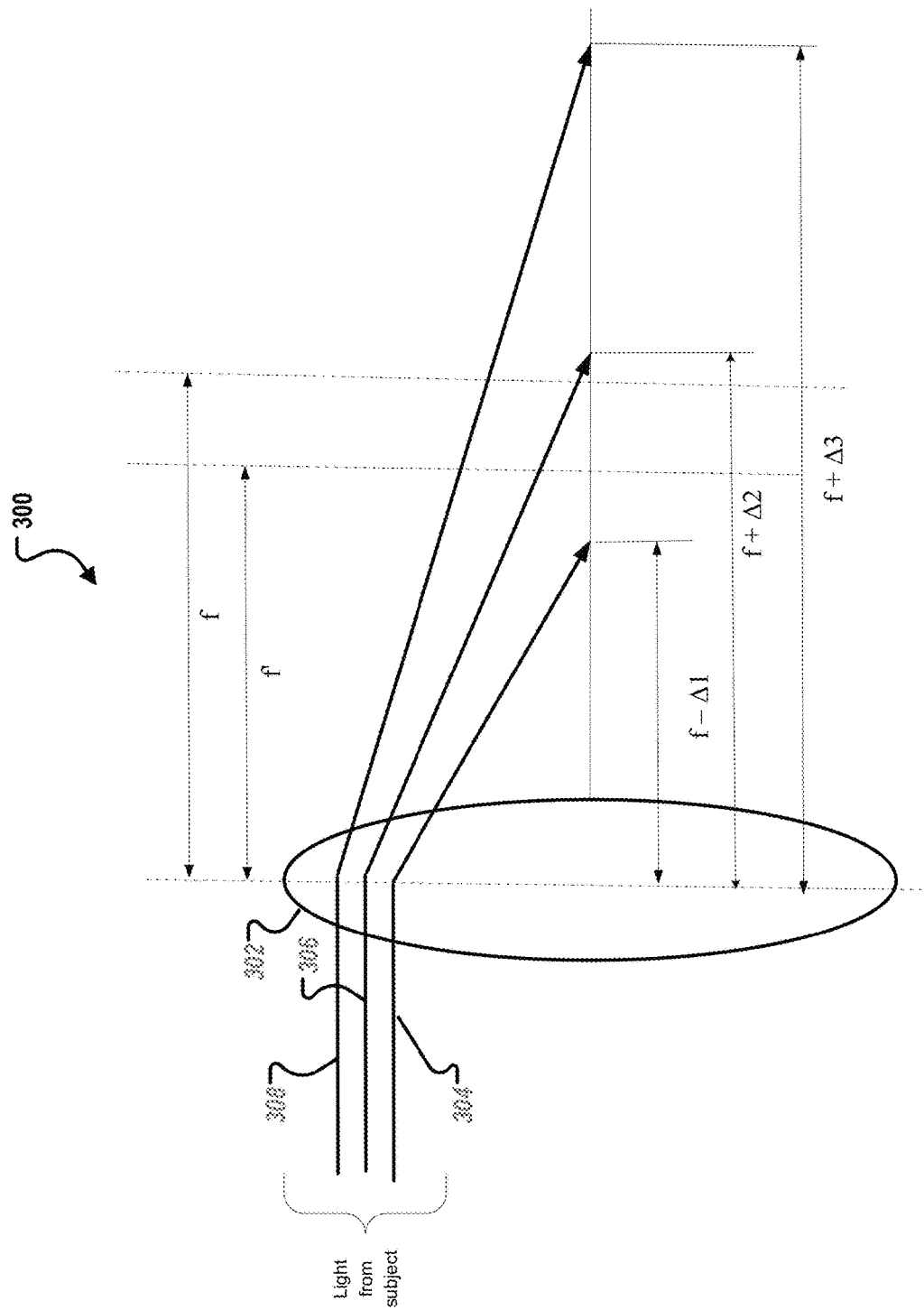
FIG. 3 is a schematic diagram illustrating leveraging the effect of chromatic aberration for fine-tuning a focal length.

FIG. 3 is a schematic diagram illustrating leveraging of the effect of chromatic aberration for fine-tuning a focal length. Chromatic aberration is an effect that is attributable to lenses having different refractive indices for different wavelengths. For example, the refractive index of some transparent materials decreases with an increase in wavelengths, and vice versa. In the example of FIG. 3, the focal length for the lens 302 is f, but the differential bending for different wavelengths can result in different effective focal lengths for different wavelengths. For example, light rays 310 of one particular wavelength can be refracted such that the effective focal distance for such rays is f+$\Delta1$. Similarly, in this example, light rays 306 and 308 of other wavelengths are refracted by the lens 302 such that the effective focal distances are f+$\Delta2$ and f+$\Delta3$, respectively. If the true focal length of the feature of interest is f, the light rays 304 would represent the best approximation of the true focal length. Therefore, if the subject is illuminated with wavelength that is reflected back in the wavelengths represented by the light rays 304, the corresponding image represents a fine-tuned focal length obtained by leveraging chromatic aberration properties of the lens 302. In some implementations, because the technology described herein uses economical/low-complexity cameras, the lenses therein are likely to have high-chromatic aberration (compared to that found in expensive high-quality lenses), which in turn aids in fine-tuning of focal length without using any moving parts in the camera. In some implementations, the wavelength range corresponding to the light rays 304 can be in the violet region (e.g., 400-450 nm), the wavelength range corresponding to the light rays 306 can be in the yellow region (e.g., 550-600 nm), and wavelength range corresponding to the light rays 308 can be in the red region (630-700 nm). The wavelength ranges can be selected, for example, based on the features of interest. For example, short wavelengths can be selected for capturing skin features, and relatively longer wavelengths (e.g., in the infrared (IR) range) can be selected for capturing iris features. In some implementations, the wavelengths that are used can be selected based on the amount of chromatic aberration of the lenses.

In some implementations, the effect of ambient illumination on captured images can be mitigated by illuminating the target with a coded illumination sequence radiated from the illumination sources. By processing the images captured under the coded illumination sequence, the effect of the controlled sources can be enhanced over the effects of the ambient illumination is such a way that the latter effects are substantially reduced in the final images, making the images appear to be substantially independent of the ambient illumination. For example, a sequence of red (R) and blue (B) illumination can be used in accordance with a coded pattern (e.g., a sequence of 2 digit Barker code (e.g. [1 0], with 1 representing illumination under the R wavelengths, and 0 representing illumination under the B wavelength). Correspondingly, the output of the R and B sensors of an RGB sensor array can be matched filtered using the length 2 Barker code [1 0] to enhance the effects due to illumination under the R and B wavelength ranges, respectively, as compared to any effects due to illumination wavelengths outside the corresponding wavelength ranges. If the matched filtering is performed for a few separate iterations, and the corresponding outputs are combined, the signal to noise ratio (or the ratio of the effects due to the wavelengths in the range of interest to the effects due to wavelengths outside the range of interest) would be significantly increased, and the resulting images would represent images that as if are captured using illumination only in the R and B wavelength ranges, respectively. In some implementations, coded illumination in a single wavelength range can also be used. For example, a maximum-correlation on-off sequence at substantially the same wavelength can be used for this purpose. For instance, a deep-blue illumination can be switched on and off following the length-7 Barker sequence (+1+1+1−1−1+1−1) by first being on for 3 consecutive time periods, then off for 2 consecutive time periods, then on for 1 time period, and finally off again for 1 frame (all synched to the camera frames captured during the corresponding time periods). Matched filtering of such frames (possibly over multiple iterations) can enhance the effects of the excitation illumination over ambient lighting. Such coded illumination and matched filtering operations are described in additional detail in U.S. application Ser. No. 16/182,372, the content of which is incorporated herein by reference.

In some implementations, once the array with the best focal distance is identified as described above (the array with focal distance f2 is selected over those with focal distances f1 and f3, in one particular example), the subject can be first illuminated with electromagnetic radiation of a first wavelength (or wavelength range) so that an image can be captured using a set of sensors of a camera array 104 corresponding to the selected image from the previous step. Multiple images, each under a different range of illumination wavelengths, can be captured, and one or more of the images that represent adequately focused features of interest can be selected for further processing. In some implementations, a focal score (e.g., a Brenner score) can be calculated for each of the multiple images, and one or more images satisfying a threshold condition can be selected for further processing. In some implementations, the image with the highest focal score is selected, and an authentication process is initiated based on the selected image. The images for various different illumination wavelength ranges can be captured using appropriate sensors of a pixel array. For example, the 'R,' 'G,' and 'B,' sensors of a pixel can be used to capture images illuminated using the corresponding wavelengths.

In some implementations, the selection of the wavelength ranges can be implemented as an adaptive process. Given the shorter focal point of shorter wavelengths and vice versa, in some implementations, if the object appears to be too close in a certain depth of field (DoF), a shorter wavelength illumination can be used. Conversely, in some implementations, if the object appears to be too far within a certain DoF, a longer wavelength illumination can be used. Such adaptive selection of the illumination wavelength ranges can be done, for example, by calculating focal scores for the collected images, and determining whether the calculated score satisfies a threshold condition.

In some implementations, multiple images can be blended to generate a high quality image of a subject. For example, a short-pass mask of a Bayer pattern can be used for imaging ocular surface vasculature and periocular textures, or to image light colored irises. In such case, if a feature of interest is a bit blurry (e.g., out-of-focus) within a DoF slice (e.g., corresponding to one of the coarse focus distances associated with a particular camera array) in bright green illumination (~550 nm) due to being too close, then a non-illuminated image (i.e., an image captured under ambient lighting conditions) can also be captured, and the difference (delta) between the illuminated and non-illuminated images can be used as a representation of low spatial frequency content of the scene. The system illumination can then be switched to deep violet (~380 nm) and a resulting delta image can be calculated similarly as a representation of high spatial frequency content of the same scene. On the other hand, if the feature of interest is determined to be too far within the DoF slice, then the deep violet illumination can be used for imaging low frequency content, and the green illumination can be used for imaging the high frequency content.

For a long-pass mask of the Bayer pattern used to image darker irises and some of the periocular features, if the image is a bit blurry within a DoF slice (e.g., corresponding to one of the coarse focus distances associated with a particular camera array) in slightly long NIR illumination (~900-950 nm) due to being too close, then then the delta between illuminated and non-illuminated capture can be used for imaging the low spatial frequency content of the scene. The illumination wavelengths can then be switched to deep red (~700-750 nm) and the resulting delta image can be used as a representation of the high spatial frequency content of the same scene. If the object is too far within that slice, then the deep red illumination can be used for imaging the low frequency content and the NIR illumination can be used for imaging the high frequency content. The high and low frequency images can then be blended together such that the blended product represents a high-quality image for a significant portion of the spectrum.

The captured images may be processed to identify/authenticate valid users, and/or permit or deny access to the services/products being offered through the kiosk. For example, the kiosk 100 may include a display device 110 (e.g., a capacitive touch screen) that allows a user to select and order food at a retail outlet. Once the user completes the selection via user-interfaces presented on the display device 110, the user may be asked to look towards the cameras array 104 for authentication. The images captured using the camera arrays 104 may then be used to authenticate/identify a pre-stored profile for the user, and the transaction may then be automatically linked to an account associated with the profile.

In some implementations, the images captured using the camera array 104 can be processed using an underlying biometric authentication system to identify/authenticate the user. In some implementations, the biometric authentication system may extract from the images, various features—such as features derived from the face, iris, vasculature underlying the sclera of the eye, or the periocular region—to identify/authenticate a particular user based on matching the extracted features to that of one or more template images stored for the user during an enrollment process. The biometric authentication system may use a machine-learning process (e.g., a deep learning process implemented, for example, using a deep neural network architecture) to match the user to one of the many templates stored for various users of the system. In some implementations, the machine learning process may be implemented, at least in part, using one or more processing devices deployed on the kiosk 100. In some implementations, the kiosk 100 may communicate with one or more remote processing devices (e.g., one or more remote servers) that implement the machine learning process.

Figure 4:
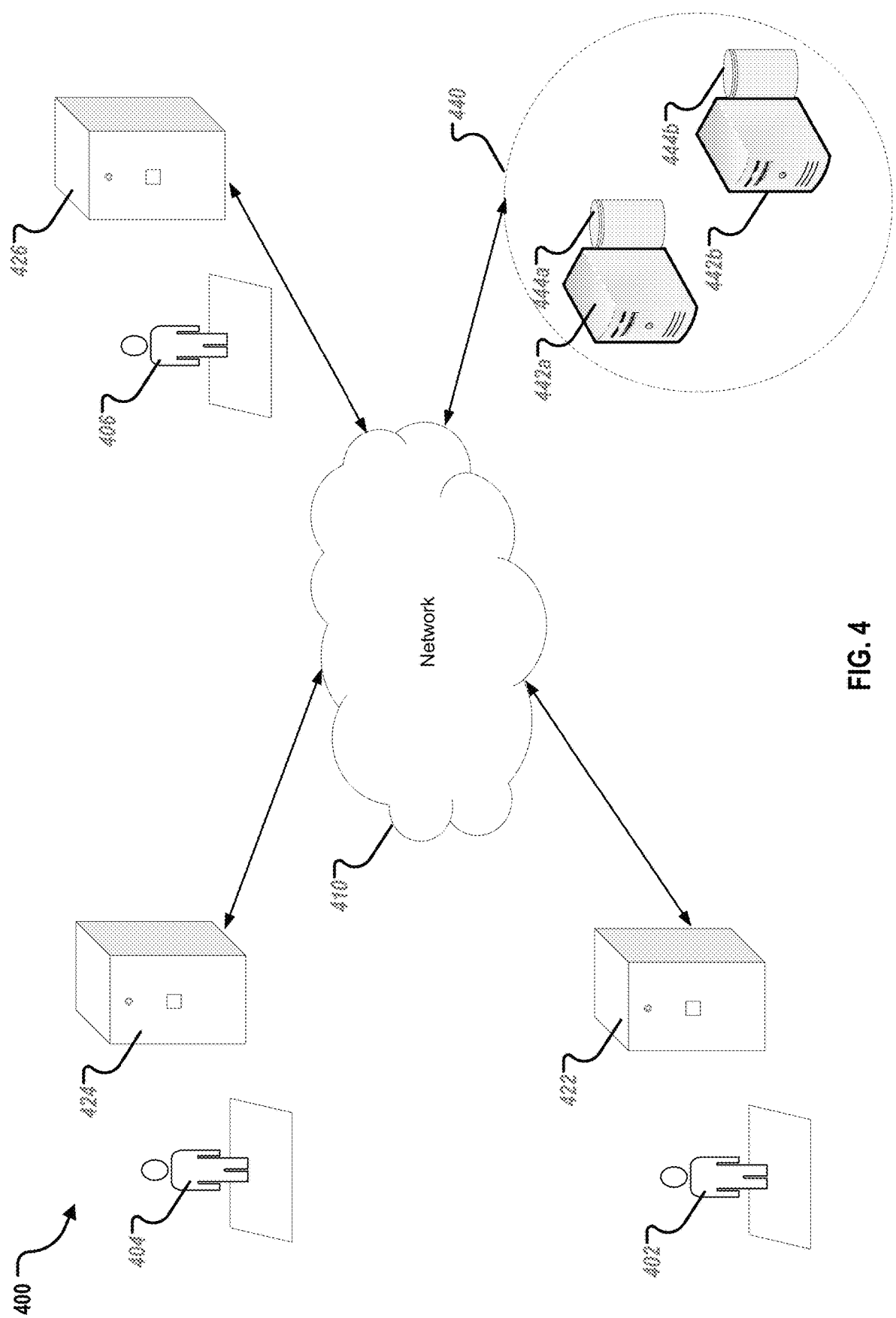
FIG. 4 depicts an example environment for a distributed biometric authentication system.

FIG. 4 depicts an example environment 400 that can be employed to execute and/or coordinate multiple instances of the described biometric authentication system, according to some implementations of the present disclosure. The example environment 400 includes a network 410, a back-end system 440, and kiosk devices 424-426. The kiosk devices 424-426 can be substantially similar to the kiosk device 100 of FIG. 1. In some implementations, the network 410 includes a local area network (LAN), wide area network (WAN), the Internet, or a combination thereof, and connects computing devices (e.g., the kiosk devices 424-426) and back-end systems (e.g., the back-end system 440). In some implementations, the network 410 can be accessed over a wired and/or a wireless communications link. In the depicted example, the back-end system 430 includes at least one server system 442 and a data store 444. In some implementations, the back-end system 440 provides access to one or more computer-implemented services with which the kiosks 424-426 may interact. The computer-implemented services may be hosted on, for example, the at least one server system 442 and the data store 444. The computer-implemented services may include, for example, an authentication service that may be used by the kiosks 434-436 to authenticate a user based on collected image data.

In some implementations, the back-end system 440 includes computer systems employing clustered computers and components to act as a single pool of seamless resources when accessed through the network 410. For example, such implementations may be used in data center, cloud computing, storage area network (SAN), and network attached storage (NAS) applications. In some implementations, the back-end system 440 is deployed and provides computer-implemented services through one or more virtual machine(s).

Figure 5:
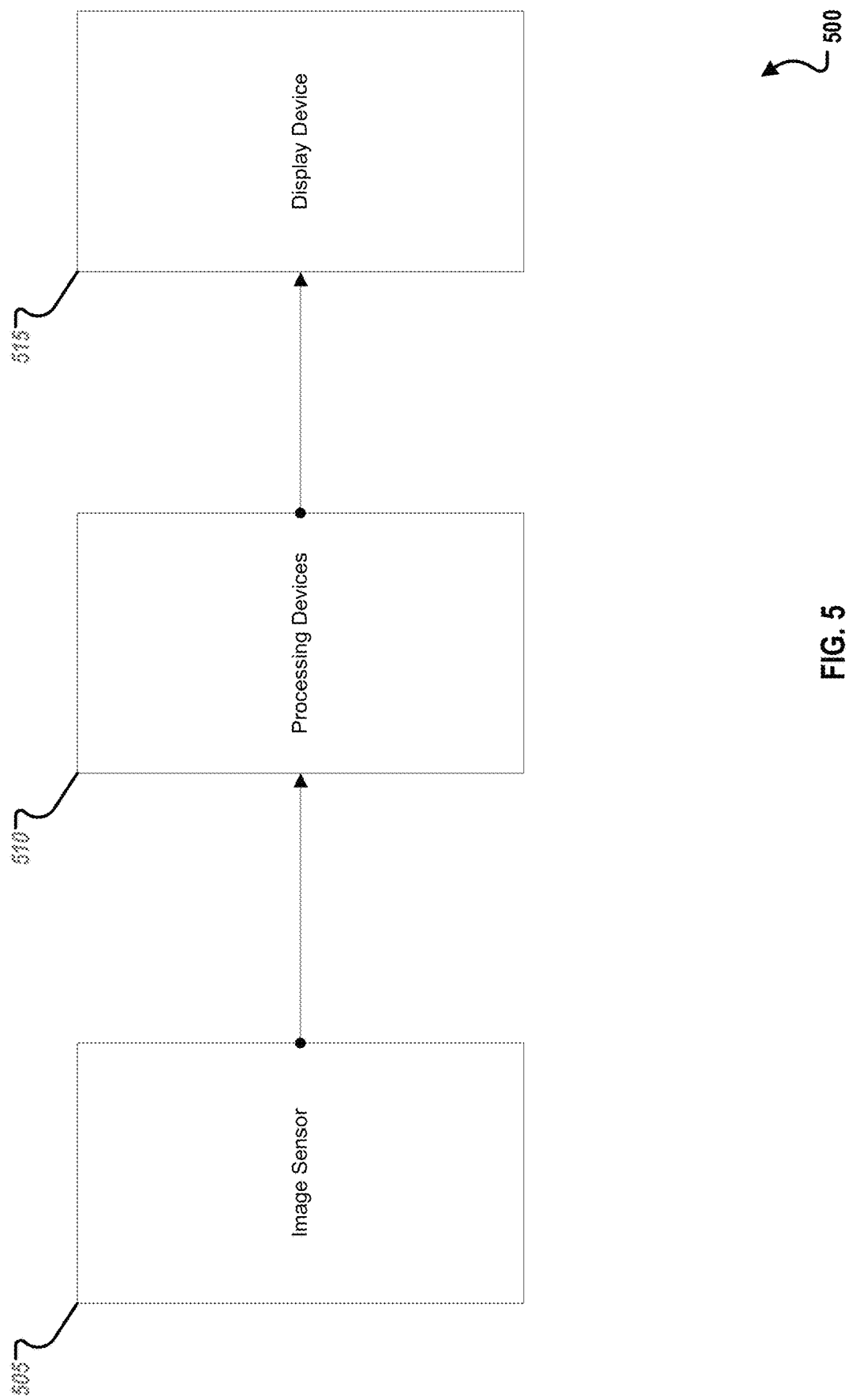
FIG. 5 depicts a system that can be used to implement the technology described herein, according to some implementations of the present disclosure.

FIG. 5 depicts a system 500 that can be used to implement the technology described herein, according to some implementations of the present disclosure. The system 500 includes image sensor 505, a processing device 510, and a display device 515. In come implementations, the system 500 may be included within a kiosk, such as described with reference to FIG. 3. For example, the display device 515 can be the display device 310 and the image sensor 505 can be a component of the camera array 104. In some implementations, the display device 515 can be disposed on a mobile device, such as a smartphone, tablet computer, or an e-reader. The image sensor 505 detects and conveys the information that constitutes an image (e.g., the pixels collected through the rolling shutter as described above). Types of image sensors include, for example, complementary metal-oxide-semiconductor (CMOS) and charge-coupled devices (CCD).

Outputs from an image sensor 505 can be processed using one or more processing devices 510. In some implementations, the output of the one or more processing devices 510 may be used to drive a display device 515. The one or more processing devices 510 can be configured to process the outputs from the image sensor 505 in various ways. In some implementations, the one or more processors 510 are configured to post-process the images captured by each camera by calculating a focus score for each image. This can include, for example, calculating a Brenna focus score corresponding to the subject captured in each image, as described above. Because the focal distance of the lens when different color light passes through is dependent on the wavelength of the light, the user will be required to stand at a region within the maximum and minimum focal distance of the lenses when different wavelength lights are received at the camera lenses.

Figure 6:
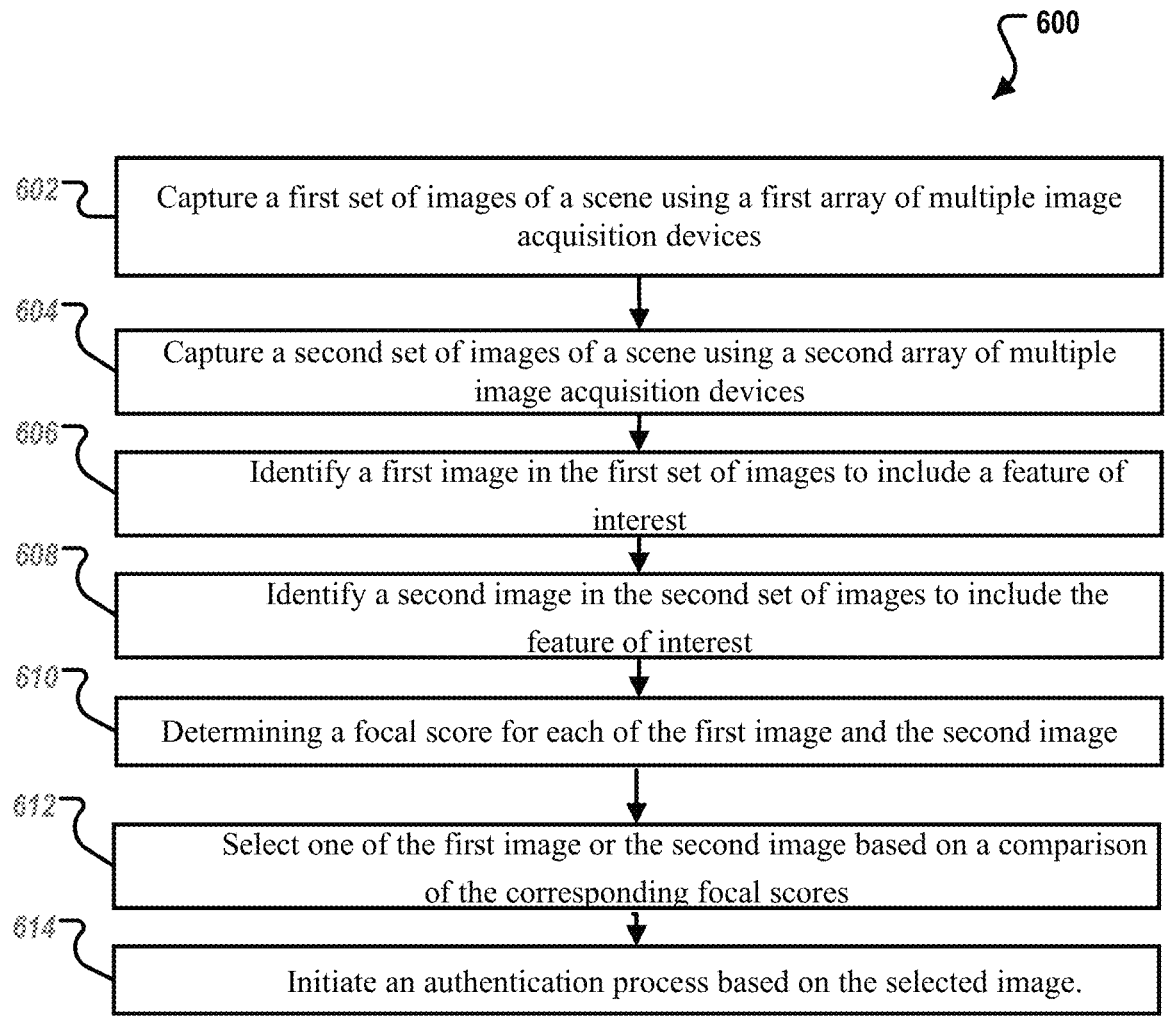
FIG. 6 depicts a flow diagram of an example process for initiating an authentication process using an image selected in accordance with technology described herein.

FIG. 6 depicts a flow diagram of an example process 600 for initiating an authentication process using an image selected in accordance with technology described herein. In some implementations, at least a portion of the process 600 can be executed on a mobile device, or a kiosk such as the kiosk 100 described above with reference to FIG. 1. In some implementations, a portion of the process 600 can be executed in a distributed computing environment such as the one described above with reference to FIG. 4. Operations of the process 600 includes capturing a first set of images of a scene using a first array of multiple image acquisition devices (602). The multiple image acquisition devices of the first array are each focused at a first distance. Operations of the process 600 also includes capturing, using a second array of multiple image acquisition devices, a second set of images of the scene (604). The multiple image acquisition devices of the second array can be each focused at a second distance that is different from the first distance. In some implementations, the fields of view of adjacent image acquisition devices in one or both of the first array and the second array have a partial overlap. The partial overlaps can be substantially similar to that described above with reference to FIG. 2B. For example, a dimension of the partial overlaps can be based on a size of a feature of interest such as an eye. In some implementations, a first zoom factor associated with the image acquisition devices in the first array is different from a second zoom factor associated with the image acquisition devices in the second array. In such implementations, the first zoom factor and the second zoom factors are selected such that a size of the feature of interest in corresponding images are substantially equal.

Operations of the process 600 also includes identifying a first image in the first set of images to include a feature of interest (606), and identifying a second image in the second set of images to include the feature of interest (608). For example, for eye-print or iris based authentication, images that include the eye of a user can be selected for further processing, whereas other images can be discarded. Operations of the process 600 can further include determining a focal score for each of the first image and the second image (610), and selecting one of the first image or the second image based on a comparison of the corresponding focal scores (612). In some implementations, the focal score can be calculated as a Brenner score. Selecting one of the first image or the second image can include selecting the image with a higher focal score.

Operations of the process 600 further includes initiating an authentication process based on the selected image (614). In some implementations, prior to initiating the authentication process, the focus for a selected image can be fine-tuned using illumination of multiple wavelengths, for example, as described above with reference to FIG. 3. This can include t illuminating the scene with electromagnetic radiation of a first wavelength range, and a capturing a third image using a first set of sensors of a pixel array of an image acquisition device corresponding to the selected image. Then the scene is illuminated with electromagnetic radiation of a second wavelength range, and a fourth image is captured using a second set of sensors of the pixel array. A focal score for each of the third image and the fourth image is then determined, and compared to select an image with a higher score. The authentication process can then be initiated based on the selected image.

In some implementations, a composite image can be generated prior to initiating the authentication process. This can include, for example, calculating a first difference image using pixel-wise differences between (i) the third image and (ii) the selected one of the first image or the second image, and calculating a second difference image using pixel-wise differences between (i) the fourth image and (ii) the selected one of the first image or the second image. A composite image can then be generated using the first and second difference images, and the authentication process can be initiated based on the composite image. One of the first and second difference images can be representative of the low spatial frequency contents of the scene and the other can be representative of the high spatial frequency contents of the scene. Which of the difference images represents the low frequency content and which of the difference images represents the high frequency content can depend on, for example, whether the feature of interest is determined to be too close under illumination by the first wavelength range or the second wavelength range.

In some implementations, initiating the authentication process based on the selected image can include illuminating the scene with electromagnetic radiation of a first wavelength range by activating a corresponding illumination source in an on-off pattern over multiple time periods. This can include, for example, activating one or more illumination sources in a coded on-off sequence (e.g., length-7 Barker code, as described above) at substantially the same wavelengths. Multiple images can be captured using a synchronized set of sensors of a pixel array of an image acquisition device corresponding to the selected image, wherein each of the multiple images are captured during a time period when the one or more illumination sources are switched on. A matched filtering operation can be performed using the multiple images to generate a third image that aggregates information content from the multiple images, the authentication process can then be initiated using the third image.

Figure 7:
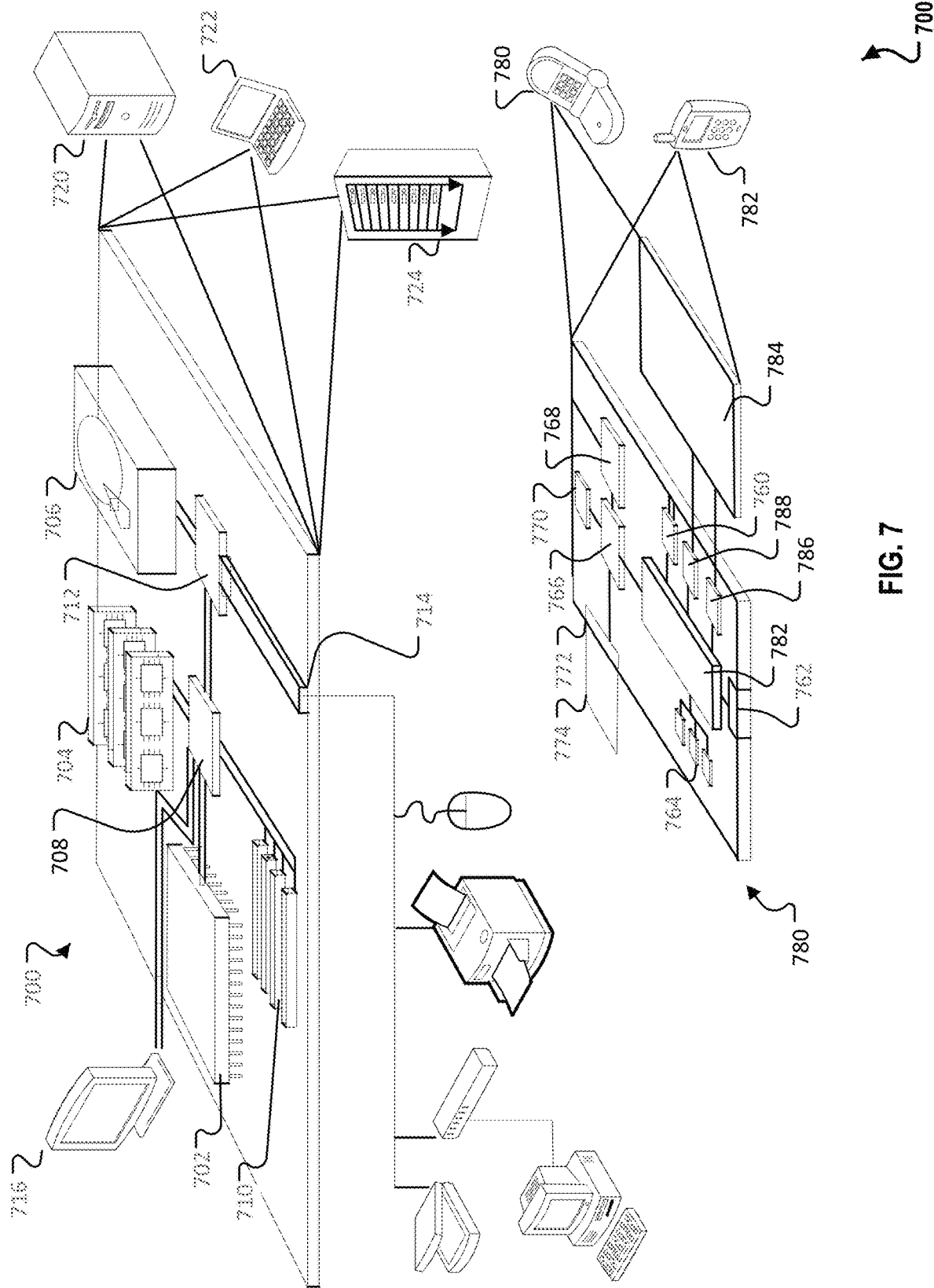
FIG. 7 shows an example of a computing device and a mobile computing device that are employed to execute implementations of the present disclosure.

FIG. 7 shows an example of a computing device 700 and a mobile computing device 750 that are employed to execute implementations of the present disclosure. The computing device 700 is intended to represent various forms of digital computers, such as laptops, desktops, workstations, personal digital assistants, servers, blade servers, mainframes, and other appropriate computers. The mobile computing device 750 is intended to represent various forms of mobile devices, such as personal digital assistants, cellular telephones, smart-phones, AR devices, and other similar computing devices. The components shown here, their connections and relationships, and their functions, are meant to be examples only, and are not meant to be limiting. In some implementations, the devices described above with reference to FIGS. 1-5 can be implemented, at least in part using the computing device 700 and/or the mobile device 750. For example, the kiosk devices described in FIGS. 1 and 4 can include at least portions of the computing device 700 and/or the mobile device 750.

The computing device 700 includes a processor 702, a memory 704, a storage device 706, a high-speed interface 708, and a low-speed interface 712. In some implementations, the high-speed interface 708 connects to the memory 704 and multiple high-speed expansion ports 710. In some implementations, the low-speed interface 712 connects to a low-speed expansion port 714 and the storage device 706. Each of the processor 702, the memory 704, the storage device 706, the high-speed interface 708, the high-speed expansion ports 710, and the low-speed interface 712, are interconnected using various buses, and may be mounted on a common motherboard or in other manners as appropriate. The processor 702 can process instructions for execution within the computing device 700, including instructions stored in the memory 704 and/or on the storage device 706 to display graphical information for a graphical user interface (GUI) on an external input/output device, such as a display 716 coupled to the high-speed interface 708. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of a computer-readable medium, such as a magnetic or optical disk.

The storage device 706 is capable of providing mass storage for the computing device 700. In some implementations, the storage device 706 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 702, perform one or more methods, such as those described above. The instructions can also be stored by one or more storage devices, such as computer-readable or machine-readable mediums, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is an example only. In some implementations, the high-speed interface 708 is coupled to the memory 704, the display 716 (e.g., through a graphics processor or accelerator), and to the high-speed expansion ports 710, which may accept various expansion cards. In the implementation, the low-speed interface 712 is coupled to the storage device 706 and the low-speed expansion port 714. The low-speed expansion port 714, which may include various communication ports (e.g., Universal Serial Bus (USB), Bluetooth, Ethernet, wireless Ethernet) may be coupled to one or more input/output devices. Such input/output devices may include a scanner 730, a printing device 734, or a keyboard or mouse 737. The input/output devices may also be coupled to the low-speed expansion port 714 through a network adapter. Such network input/output devices may include, for example, a switch or router 732.

The computing device 700 may be implemented in a number of different forms, as shown in the FIG. 7. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device, such as a mobile computing device 750. Each of such devices may contain one or more of the computing device 700 and the mobile computing device 750, and an entire system may be made up of multiple computing devices communicating with each other.

The mobile computing device 750 includes a processor 752; a memory 774; an input/output device, such as a display 754; a communication interface 777; and a transceiver 778; among other components. The mobile computing device 750 may also be provided with a storage device, such as a micro-drive or other device, to provide additional storage. Each of the processor 752, the memory 774, the display 754, the communication interface 777, and the transceiver 778, are interconnected using various buses, and several of the components may be mounted on a common motherboard or in other manners as appropriate. In some implementations, the mobile computing device 750 may include a camera device(s) (not shown).

The processor 752 can execute instructions within the mobile computing device 750, including instructions stored in the memory 774. The processor 752 may be implemented as a chipset of chips that include separate and multiple analog and digital processors. For example, the processor 752 may be a Complex Instruction Set Computers (CISC) processor, a Reduced Instruction Set Computer (RISC) processor, or a Minimal Instruction Set Computer (MISC) processor. The processor 752 may provide, for example, for coordination of the other components of the mobile computing device 750, such as control of user interfaces (UIs), applications run by the mobile computing device 750, and/or wireless communication by the mobile computing device 750.

The processor 752 may communicate with a user through a control interface 758 and a display interface 757 coupled to the display 754. The display 754 may be, for example, a Thin-Film-Transistor Liquid Crystal Display (TFT) display, an Organic Light Emitting Diode (OLED) display, or other appropriate display technology. The display interface 757 may comprise appropriate circuitry for driving the display 754 to present graphical and other information to a user. The control interface 758 may receive commands from a user and convert them for submission to the processor 752. In addition, an external interface 772 may provide communication with the processor 752, so as to enable near area communication of the mobile computing device 750 with other devices. The external interface 772 may provide, for example, for wired communication in some implementations, or for wireless communication in other implementations, and multiple interfaces may also be used.

The memory 774 stores information within the mobile computing device 750. The memory 774 can be implemented as one or more of a computer-readable medium or media, a volatile memory unit or units, or a non-volatile memory unit or units. An expansion memory 774 may also be provided and connected to the mobile computing device 750 through an external interface 772, which may include, for example, a Single in Line Memory Module (SIMM) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provided as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 752, perform one or more methods, such as those described above. The instructions can also be stored by one or more storage devices, such as one or more computer-readable or machine-readable mediums, such as the memory 774, the expansion memory 774, or memory on the processor 752. In some implementations, the instructions can be received in a propagated signal, such as, over the transceiver 778 or the external interface 772.

The mobile computing device 750 may communicate wirelessly through the communication interface 777, which may include digital signal processing circuitry where necessary. The communication interface 777 may provide for communications under various modes or protocols, such as Global System for Mobile communications (GSM) voice calls, Short Message Service (SMS), Enhanced Messaging Service (EMS), Multimedia Messaging Service (MIMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 778 using a radio frequency. In addition, short-range communication, such as using a Bluetooth or Wi-Fi, may occur. In addition, a Global Positioning System (GPS) receiver module may provide additional navigation- and location-related wireless data to the mobile computing device 750, which may be used as appropriate by applications running on the mobile computing device 750.

The mobile computing device 750 may also communicate audibly using an audio codec 770, which may receive spoken information from a user and convert it to usable digital information. The audio codec 770 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in FIG. 7. For example, it may be implemented as the kiosk 100 described in FIG. 1. Other implementations may include a mobile device 782 and a tablet device 784. The mobile computing device 750 may also be implemented as a component of a smart-phone, personal digital assistant, AR device, or other similar mobile device.

Computing device 700 and/or 750 can also include USB flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which may be for a special or general purpose, coupled to receive data and instructions from, and to transmit data and instructions to, a storage system, at least one input device, and at least one output device.

These computer programs (also known as programs, software, software applications, or code) include machine instructions for a programmable processor, and can be implemented in a high-level procedural, object-oriented, assembly, and/or machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a GUI or a web browser through which a user can interact with an implementation of the systems and techniques described here), or any combination of such back end, middleware, or front end components. The components of the system can be interconnected by any form or medium of digital data communication, such as network 410 of FIG. 4. Examples of communication networks include a LAN, a WAN, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method, comprising:
    capturing, using a first array of multiple image acquisition devices, a first set of images of a scene, wherein the multiple image acquisition devices of the first array are each focused at a first distance;
    capturing, using a second array of multiple image acquisition devices, a second set of images of the scene, wherein the multiple image acquisition devices of the second array are each focused at a second distance that is different from the first distance;
    identifying a first image in the first set of images to include a feature of interest;
    identifying a second image in the second set of images to include the feature of interest;
    determining a focal score for each of the first image and the second image;
    selecting one of the first image or the second image based on a comparison of the corresponding focal scores; and
    initiating an authentication process based on the selected image.

2. The method of claim 1, wherein fields of view of adjacent image acquisition devices in each of the first array and the second array have a partial overlap.

3. The method of claim 2, wherein a dimension of the partial overlap is configured based on a size of the feature of interest.

4. The method of claim 1, further comprising:
    illuminating the scene with electromagnetic radiation of a first wavelength range;
    capturing a third image using a first set of sensors of a pixel array of an image acquisition device corresponding to the selected image;
    illuminating the scene with electromagnetic radiation of a second wavelength range;
    capturing a fourth image using a second set of sensors of the pixel array;
    determining a focal score for each of the third image and the fourth image; and
    initiating the authentication process based on at least one of the third image or the fourth image that has the higher focal score.

5. The method of claim 4, further comprising:
    calculating a first difference image using pixel-wise differences between (i) the third image and (ii) the selected one of the first image or the second image;
    calculating a second difference image using pixel-wise differences between (i) the fourth image and (ii) the selected one of the first image or the second image
    generating a composite image using the first and second difference images; and
    initiating the authentication process based on the composite image.

6. The method of claim 1, wherein a first zoom factor associated with the image acquisition devices in the first array is different from a second zoom factor associated with the image acquisition devices in the second array.

7. The method of claim 6, wherein the first zoom factor and the second zoom factors are selected such that a size of the feature of interest in corresponding images are substantially equal.

8. The method of claim 4, wherein the scene is illuminated with electromagnetic radiation of the first wavelength range and the second wavelength range in a coded pattern.

9. The method of claim 1, wherein initiating the authentication process based on the selected image comprises:
    illuminating the scene with electromagnetic radiation of a first wavelength range by activating a corresponding illumination source in an on-off pattern over multiple time periods;
    capturing multiple images using a set of sensors of a pixel array of an image acquisition device corresponding to the selected image, wherein each of the multiple images are captured during a time period when the illumination source is switched on;
    performing a matched filtering operation using the multiple images to generate a third image that aggregates information content from the multiple images; and
    initiating the authentication process using the third image.

10. An imaging system comprising:
    a first array of multiple image acquisition devices that captures a first set of images of a scene, wherein the multiple image acquisition devices of the first array are each focused at a first distance;
    a second array of multiple image acquisition devices that captures a second set of images of the scene, wherein the multiple image acquisition devices of the second array are each focused at a second distance that is different from the first distance; and
    one or more processing devices programmed to:
        identify a first image in the first set of images to include a feature of interest,
        identify a second image in the second set of images to include the feature of interest,
        determine a focal score for each of the first image and the second image;
        select one of the first image or the second image based on a comparison of the corresponding focal scores, and
        initiate an authentication process based on the selected image.

11. The system of claim 10, wherein fields of view of adjacent image acquisition devices in each of the first array and the second array have a partial overlap.

12. The system of claim 11, wherein a dimension of the partial overlap is configured based on a size of the feature of interest.

13. The system of claim 10, further comprising:
    one or more illumination sources for illuminating the scene with electromagnetic radiation of a first wavelength range during a first time period, and a second wavelength range during a second time period,
    wherein,
        a first set of sensors of a pixel array of an image acquisition device corresponding to the selected image captures a third image under illumination of the first wavelength range,
        a second set of sensors of the pixel array captures a fourth image under illumination of the second wavelength range, and
        the one or more processing devices are further programmed to:
            determine a focal score for each of the third image and the fourth image, and
            initiate the authentication process based on at least one of the third image or the fourth image that has the higher focal score.

14. The system of claim 13, wherein the one or more processing devices are programmed to:
- calculate a first difference image using pixel-wise differences between (i) the third image and (ii) the selected one of the first image or the second image;
- calculate a second difference image using pixel-wise differences between (i) the fourth image and (ii) the selected one of the first image or the second image
- generate a composite image using the first and second difference images; and
- initiate the authentication process based on the composite image.

15. The system of claim 10, wherein a first zoom factor associated with the image acquisition devices in the first array is different from a second zoom factor associated with the image acquisition devices in the second array.

16. The system of claim 15, wherein the first zoom factor and the second zoom factors are selected such that a size of the feature of interest in corresponding images are substantially equal.

17. The system of claim 13, wherein the one or more illumination sources illuminate the scene with electromagnetic radiation of the first wavelength range and the second wavelength range in a coded pattern.

18. The system of claim 10, further comprising:
- one or more illumination sources to illuminate the scene with electromagnetic radiation of a first wavelength range in an on-off pattern over multiple time periods; and
- a first set of sensors of a pixel array of an image acquisition device corresponding to the selected image, the first set of sensors synchronized with the one or more illumination sources to capture multiple images, each of which is captured during a time period when the one or more illumination sources are switched on, wherein the one or more processing devices are programmed to:
- perform a matched filtering operation using the multiple images to generate a third image that aggregates information content from the multiple images, and
- initiate the authentication process using the third image.

19. One or more machine-readable storage devices having encoded thereon computer readable instructions for causing one or more processing devices to perform operations comprising:
- generating a first control signal for operating a first array of multiple image acquisition devices to capture a first set of images of a scene, wherein the multiple image acquisition devices of the first array are each focused at a first distance;
- generating a second control signal for operating a second array of multiple image acquisition devices to capture a second set of images of the scene, wherein the multiple image acquisition devices of the second array are each focused at a second distance that is different from the first distance;
- identifying a first image in the first set of images to include a feature of interest;
- identifying a second image in the second set of images to include the feature of interest;
- determining a focal score for each of the first image and the second image;
- selecting one of the first image or the second image based on a comparison of the corresponding focal scores; and
- initiating an authentication process based on the selected image.

20. The one or more machine-readable storage devices of claim 19, further comprising instructions for:
- generating a third control signal for activating one or more illumination sources to illuminate the scene with electromagnetic radiation of a first wavelength range;
- causing a first set of sensors of a pixel array of an image acquisition device corresponding to the selected image to capture a third image;
- generating a fourth control signal for activating the one or more illumination sources to illuminate the scene with electromagnetic radiation of a second wavelength range;
- causing a second set of sensors of the pixel array to capture a fourth image;
- determining a focal score for each of the third image and the fourth image; and
- initiating the authentication process based on at least one of the third image or the fourth image that has the higher focal score.

* * * * *